(12) United States Patent
Zhang et al.

(10) Patent No.: US 10,193,472 B2
(45) Date of Patent: Jan. 29, 2019

(54) SINGLE FRICTION SURFACE TRIBOELECTRIC MICROGENERATOR AND METHOD OF MANUFACTURING THE SAME

(71) Applicant: PEKING UNIVERSITY, Beijing (CN)

(72) Inventors: Haixia Zhang, Beijing (CN); Bo Meng, Beijing (CN); Wei Tang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 518 days.

(21) Appl. No.: 14/760,174

(22) PCT Filed: Mar. 13, 2013

(86) PCT No.: PCT/CN2013/072522
§ 371 (c)(1),
(2) Date: Jul. 9, 2015

(87) PCT Pub. No.: WO2014/114028
PCT Pub. Date: Jul. 31, 2014

(65) Prior Publication Data
US 2015/0349664 A1 Dec. 3, 2015

(30) Foreign Application Priority Data
Jan. 28, 2013 (CN) .......................... 2013 1 0032306

(51) Int. Cl.
*H02N 1/04* (2006.01)
(52) U.S. Cl.
CPC ..................... *H02N 1/04* (2013.01)
(58) Field of Classification Search
CPC .. H02N 1/00; H02N 1/04; G06F 3/044; G06F 3/045

(Continued)

(56) References Cited

U.S. PATENT DOCUMENTS

2006/0273689 A1 12/2006 Kataoka
2008/0111446 A1 5/2008 Matsuki
(Continued)

FOREIGN PATENT DOCUMENTS

CN 101710744 A 5/2010
CN 102640411 A 8/2012
(Continued)

OTHER PUBLICATIONS

Lin, Machine Translation of DE202012009584, Oct. 2012.*
(Continued)

*Primary Examiner* — Quyen P Leung
*Assistant Examiner* — Eric Johnson
(74) *Attorney, Agent, or Firm* — Seed IP Law Group LLP

(57) ABSTRACT

A single friction surface microgenerator and a method of manufacturing the same are described. The microgenerator comprises an insulating substrate with a surface-friction-structured layer on its upper surface and a first induction electrode and a second induction electrode on its lower surface. The first induction electrode is located to correspond to the surface-friction-structured layer that is used as a friction surface while the second induction electrode is located periphery of the first induction electrode and insulatedly spaced from the first induction electrode. The single friction surface microgenerator according to the present disclosure has a wide usage and the method of manufacturing the same may be performed through a simply and high-effective production process, processed at low cost, and may achieve high yield.

12 Claims, 2 Drawing Sheets

(58) Field of Classification Search
USPC .................. 310/300, 309, 310; 322/2 A, 2 R
See application file for complete search history.

(56) References Cited

U.S. PATENT DOCUMENTS

| | | | | |
|---|---|---|---|---|
| 2011/0050181 A1* | 3/2011 | Post | ................. | H02N 1/04 320/166 |
| 2011/0193776 A1* | 8/2011 | Oda | ................. | G06F 3/046 345/157 |
| 2015/0035408 A1* | 2/2015 | Despesse | ................. | H02N 1/08 310/310 |

FOREIGN PATENT DOCUMENTS

| | | | | |
|---|---|---|---|---|
| CN | 102646788 A | | 8/2012 | |
| CN | 102683573 A | | 9/2012 | |
| CN | 202679272 U | | 1/2013 | |
| CN | 202693947 U | | 1/2013 | |
| CN | 103023371 A | | 4/2013 | |
| DE | 202012009584 U1 * | | 10/2012 | ............. G06F 3/044 |
| JP | 2012-135071 A | | 7/2012 | |

OTHER PUBLICATIONS

Post et al., Electrostatic Power Harvesting in Textiles, 2010, Proc. ESA Annual Meeting on Electrostatics Paper G1.*
English Translation of the Written Opinion dated Nov. 7, 2013, for corresponding International Application No. PCT/CN2013/072522, 5 pages.
Fan et al., "Transparent Triboelectric Nanogenerators and Self-Powered Pressure Sensors Based on Micropatterned Plastic Films" *Nano Letters* 12:3109-3114, 2012.
Fan et al., "Flexible triboelectric generator!," *Nano Energy 1:*328-334, 2012.
Qin et al., "Microfibre-nanowire hybrid structure for energy scavenging," *Nature* 451:809-813, 2008.
Wang et al., "Piezoelectric Nanogenerators Based on Zinc Oxide Nanowire Arrays," *Science* 312:242-246, 2006.
Wang et al., "Direct-Current Nanogenerator Driven by Ultrasonic Waves," *Science 316:*102-105, 2007.
Wang et al., "Nanoscale Triboelectric-Effect-Enabled Energy Conversion for Sustainably Powering Portable Electronics," *Nano Letters* 12:6339-6346, 2012.

* cited by examiner

SINGLE FRICTION SURFACE TRIBOELECTRIC MICROGENERATOR AND METHOD OF MANUFACTURING THE SAME

BACKGROUND

Technical Field

The present disclosure relates to a single friction surface triboelectric microgenerator and a method of manufacturing the same, and particularly, to a single friction surface triboelectric microgenerator that is operated based on the electrostatic induction effect.

Description of the Related Art

It is important for not only applications of electronic devices but also energy source sustainable development to develop a microgenerator to capture energy from our living environment so as to achieve a self power supplying of implanted type medical devices, wireless transmission systems and even consumption electronics. Various types of microgenerators have been fabricated by researchers based on photoelectricity, piezoelectricity, thermoelectricity and electrostatic induction etc. and implemented to some extent.

A triboelectric microgenerator based on electrostatic induction principle may perform mechanical energy collection from surroundings with high efficiency and achieves a high output power density and energy conversion efficiency. An arch-shaped triboelectric nanogenerator based on electrostatic induction principle (WANG, S., Lin, L. and WANG, Z. L, Nanoscale triboelectric-effect-enabled energy conversion for sustainably powering portable electronics, Nano Letters 12, 6339-6346 (2012)) has been manufactured by means of micro/nano processing techniques, and may achieve a relative high instantaneous output electrical voltage. However, during fabrication of this type of generator, an arch-shaped structure needs to be prepared through a multilayer laminated film, which results in a complicated process and high cost, and thus is hard to practice widely for its arch-structured design.

As for consumption electronics, such as a touch-controlled phone, a tablet computer, a touch-controlled computer, a user operates the device through ceaseless touches during usual usage. During ceaselessly touching, abundant mechanical energy is consumed. A touch screen integrated with planar generator may capture this type of mechanical energy and transform it as electrical energy, which charges the device and thus extends using time. This type device may even achieve a self power supply, and thus have very wide applications.

BRIEF SUMMARY

It is an objective of the present application to provide a single friction surface microgenerator and a method of manufacturing the same, which is configured in single friction surface design. The friction surface may be adapted to be functioned as a second friction surface when it is touched by a finger or other object. During contacting, charge transfer occurs. Specifically, when the friction surface is separated from the finger or other object, there is a voltage difference between an induction electrode corresponding to the friction surface and the other induction electrode that approximates to zero voltage. When the two electrodes are connected, an electrical current is generated, thereby transforming the mechanical energy from touching to electrical energy. The single friction surface microgenerator provided by the present application may be sized in thickness up to 10 μm so that it is transparent in the whole, and is potentially applied in consumption electronics field, such as a touch-controlled phone, a tablet, and a touch-controlled computer. The method according to the present disclosure may be performed through a simply and high-effective production process, processed at low cost, and may achieve high yield.

According to an embodiment, there is provided a single friction surface microgenerator, which structurally includes a first induction electrode, a second induction electrode, an insulating substrate and a surface-friction-structured layer that is used as a friction surface, wherein the first induction electrode is located to correspond to the surface-friction-structured layer that is used as a friction surface (i.e., friction working area) while the second induction electrode is located periphery of the first induction electrode and insulated from the first induction electrode. As the second induction electrode is spaced from the surface-friction-structured layer used as a friction surface by a certain distance, it is affected weakly by charges of the friction surface, even is approximately at zero potential.

In the above embodiment, the insulating substrate may be made by a transparent insulating material, such as polyethylene terephthalate (PET), glass, etc., and has a thickness of 5 μm~100 μm. The insulating substrate may be adapted to a smooth surface in any shapes, such as a planar surface, an arched surface, a spherical surface, etc.

In the above embodiment, the first induction electrode and the second induction electrode are made by a transparent conductive material, such as tin indium oxide semiconductor (ITO), etc., and has a thickness of 0.1 μm~20 μm.

In the above embodiment, the surface-friction-structured layer may be a smooth surface or a surface with micro/nano structures. As for touch-controlled application, a finger is preferentially considered (others, including a finger with a glove, may operate). The surface-friction-structured layer may be made by a transparent material (preferably material that is likely to obtain electrons and produce a bigger output voltage; however, a material that is not likely to obtain electron may also be used), such as PET, polydimethylsiloxane (PDMS), polyvinylchloride (PVC), and polytetrafluoroethylene (PTFE) etc., which likely produces charge transfer when touched by a finger.

According to the present disclosure, there is also provided a method of manufacturing a single friction surface microgenerator, comprising:

a. depositing or coating a transparent conductive film on the bottom surface of an insulating substrate;

b. patterning the conductive film through photolithography and chemical etch or physical etch, to form a first induction electrode and a second induction electrode;

c. processing a surface-friction-structured layer on top of the insulating substrate; wherein the first induction electrode is located to correspond to the surface-friction-structured layer that is used as a friction surface and the second induction electrode is located periphery of the first induction electrode and insulated from the first induction electrode. As the second induction electrode is spaced from the surface-friction-structured layer used as a friction surface by a certain distance, it is affected weakly by charges of the friction surface, even is approximately at zero potential.

In the above method of manufacturing a single friction surface microgenerator, at act a, the insulating substrate is made by a transparent insulating material, such as polyethylene terephthalate (PET), polyimide (PI), glass, etc.

In the above method of manufacturing a single friction surface microgenerator, at act a, the first induction electrode and the second induction electrode are made by a transparent conductive material, such as ITO, et. cl.

In the above method of manufacturing a single friction surface microgenerator, at act e, the surface-friction-structured layer may be a smooth surface or a surface having micro/nano array structures and is made by a transparent material that produces electron transfer when touched by a finger, such as PET, polydimethylsiloxane (PDMS), polyvinylchloride (PVC), and polytetrafluoroethylene (PTFE) etc.

It is appreciated that the above mentioned steps may not be performed in a constant order, but may be in a modified sequence or may be pruned as required.

The single friction surface microgenerator according to the present disclosure has advantages as below:

1. Compared with a double friction surface microgenerator, the single friction surface microgenerator according to the present disclosure has a wider usage. It is transparent in the whole, has a thickness up to 10 µm, and is potentially applied in consumption electronics, such as a touch-controlled phone, a tablet, a touch-controlled computer.

2. The method according to the present disclosure may be performed through a simply and high-effective production process, processed at low cost, and may achieve high yield.

The reference numbers list:

1—PET substrate, 2—a first induction electrode, 3—a second induction electrode, 4—pyramid-shaped PDMS array (surface-friction-structured layer), 5—PET substrate having micro/nano pattern array

DETAILED DESCRIPTION

The embodiments of the present disclosure will be described further in detailed with reference to the accompanying drawings.

Embodiment 1

Figure 1:
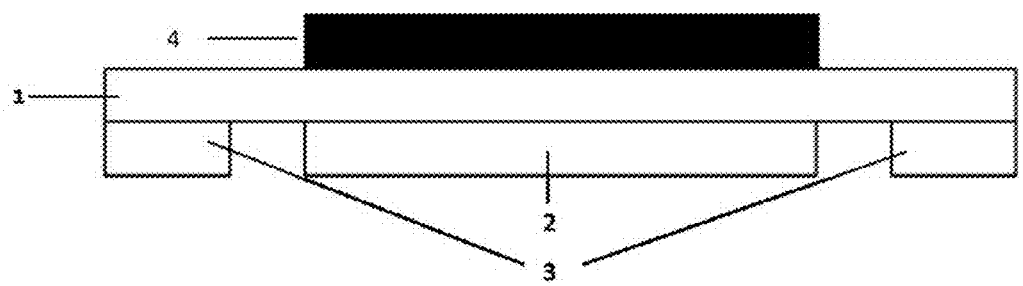
FIG. 1 is a schematic structural view of a single friction surface microgenerator according to the present disclosure.

According to an embodiment of the present disclosure, there is provided a method of manufacturing a single friction surface microgenerator as shown in FIG. 1. The manufactured generator structurally includes a PET substrate 1, a first induction electrode 2, a second induction electrode 3 and a pyramid-shaped PDMS array 4 (i.e., surface-friction-structured layer).

The detailed manufacturing method includes acts of:

a. depositing an ITO film on a lower surface of the PET substrate 1 through sputtering or chemical vapor deposition process, in which the PET substrate has a thickness of 5 µm~100 µm and the ITO film has a thickness of 0.1 µm~5 µm.

b. patterning the ITO film through photoetch and chemical etch or physical etch, so as to form an first induction electrode 2 and a second induction electrode 3, in which the first induction electrode 1 is in a rectangle shape and the second induction electrode is in a ring shape surrounding the first induction electrode, the second induction electrode being insulated and spaced from the first induction electrode;

c. obtaining the pyramid-shaped array 4 by a film casting transfer process on a surface of the PET substrate 1, i.e., a surface-friction-structured layer, thereby producing a single friction surface microgenerator; wherein the surface-friction-structured layer is located to correspond to the first induction electrode and is used as a friction-structured layer receiving friction from outside while imparts weak influence on the second induction electrode for being spaced relatively far from the second induction electrode. That is, the second induction electrode may be approximated as zero potential.

Figure 2:
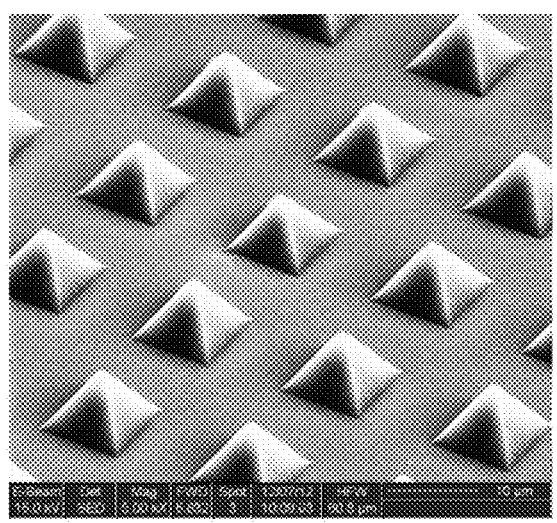
FIG. 2 is a scanning electron microscope picture of pyramid-shaped PDMS array provided according to the present disclosure.

The pyramid-shaped PDMS array has a characteristic size of 2 µm~50 µm and a spacing of 2 µm~50 µm, as shown in a scanning microscope picture in FIG. 2.

Figure 3:
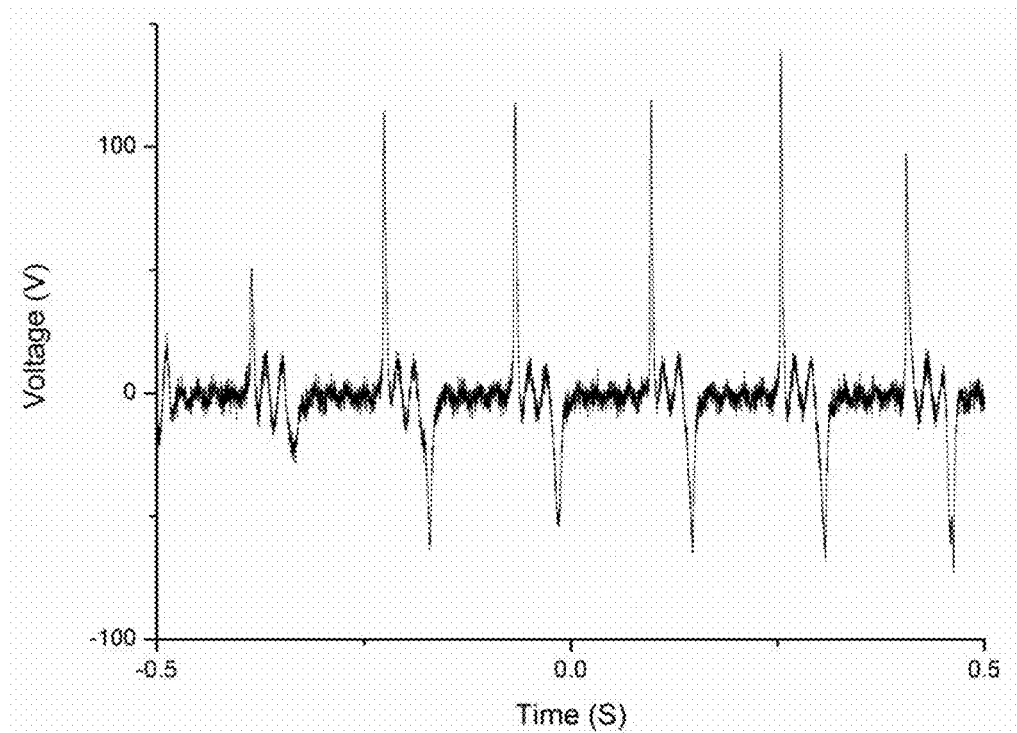
FIG. 3 is a schematic view of an output voltage measurement of a single friction surface microgenerator produced by the method according to the first embodiment when knocked by a finger.

The single friction surface microgenerator manufactured through the above mentioned method may output voltage measurements as shown in FIG. 3 when being slightly contacted by a finger.

Embodiment 2

Figure 4:
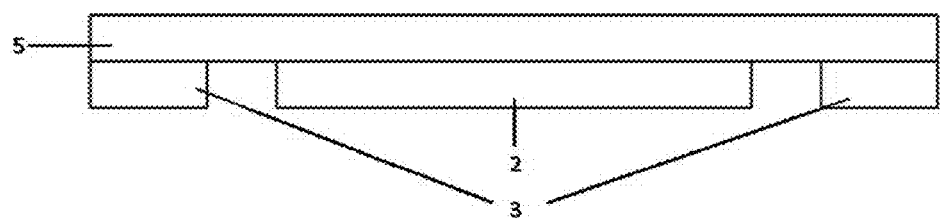
FIG. 4 is a schematic structural view of another single friction surface microgenerator according to the present disclosure.

According to an embodiment of the present disclosure, there is provided a method of manufacturing a single friction surface microgenerator as shown in FIG. 4.

The single friction surface microgenerator in FIG. 4 structurally includes a substrate 5 (PET layer) including micro/nano pattern array, a first induction electrode 2, a second induction electrode 3.

The detailed manufacturing method includes acts of:

a. forming a PET layer 5 with micro/nano pattern array on its upper surface through casting mold process as a surface-friction-structured layer, in which the PET layer has a thickness of 5 µm~100 µm;

b. depositing an ITO film on a lower surface of the PET substrate 5 through sputtering process or chemical vapor deposition method, in which the ITO film has a thickness of 0.1 µm~5 µm;

c. patterning the ITO film through photoetch and chemical etch or physical etch, so as to form a first induction electrode 2 and a second induction electrode 3, thereby obtaining a single friction surface microgenerator. The first induction electrode is located to correspond to the surface-friction-structured layer that is used as a friction surface while the second induction electrode is located periphery of the first induction electrode and insulatedly spaced from the first induction electrode. As the second induction electrode is spaced from the surface-friction-structured layer used as a friction surface by a certain distance, it is affected weakly by charges of the friction surface, even is approximately at zero potential. The first induction electrode is in a rectangle shape and the second induction electrode is in a ring shape surrounding the first induction electrode.

A single friction surface microgenerator and a method of manufacturing the same according to the present disclosure have been described together with the working principle and embodiments thereof, so as to aid those skilled in the art to understand the key principle and the method of the present disclosure. It would be appreciated by those skilled in the art that the above embodiments are intended to be illustrative for purpose of description, but not limitative. Changes and equivalents, which are made without departing from teaching of the present application and the scopes of claims, should be include within the scopes of claims of the present application.

The invention claimed is:

1. A single friction surface microgenerator, comprising an insulating substrate having an upper surface and a lower surface, with a surface-friction-structured layer on the upper surface and a first induction electrode and a second induction electrode on the lower surface; wherein the first induction electrode is located to correspond to the surface-friction-structured layer that is used as a friction surface while the second induction electrode is located peripherially of the first induction electrode and insulatedly spaced from the first induction electrode, the second induction electrode surrounds the first induction electrode in a ring shape, and the surface-friction-structured layer has a number of micro/nano array structures or is a smooth surface.

2. The single friction surface microgenerator according to claim 1 wherein the first induction electrode is an induction electrode made by a transparent material and the second induction electrode is an induction electrode made by a transparent material.

3. The single friction surface microgenerator according to claim 2 wherein the transparent material is tin indium oxide (ITO) and the insulating substrate is in a shape of one of a planar surface, an arched surface, or a spherical surface.

4. The single friction surface microgenerator according to claim 1 wherein the surface-friction-structured layer is made by a transparent material that produces charge transfer when sufficiently touched.

5. The single friction surface microgenerator according to claim 4 wherein the surface-friction-structured layer is made by a transparent material that obtains electrons when touched.

6. The single friction surface microgenerator according to claim 1 wherein the first induction electrode is an induction electrode made by a transparent material and the second induction electrode is an induction electrode made by a transparent material.

7. The single friction surface microgenerator according to claim 1, wherein the surface-friction-structured layer is made by a transparent material that produces charge transfer when sufficiently touched.

8. A method of manufacturing a single friction surface microgenerator, comprising:
providing an insulating substrate having an upper surface and a lower surface with a surface-friction-structured layer on the upper surface, or providing an insulating substrate and then forming a surface-friction-structured layer on the upper surface;
forming a first induction electrode and a second induction electrode on the lower surface of the insulating substrate, wherein the first induction electrode is located to correspond to the surface-friction-structured layer that is used as a friction surface while the second induction electrode is located periphery of the first induction electrode and insulatedly spaced from the first induction electrode, wherein the second induction electrode surrounds the first induction electrode in a ring shape, and the surface-friction-structured layer is a surface having number of micro/nano array structures or is a smooth surface.

9. The method of manufacturing a single friction surface microgenerator according to claim 8 wherein the first induction electrode is an induction electrode made by a transparent material and the second induction electrode is an induction electrode made by a transparent material.

10. The method of manufacturing a single friction surface microgenerator according to claim 9 wherein the surface-friction-structured layer is made by a transparent material that produces charge transfer when sufficiently touched.

11. The method of manufacturing a single friction surface microgenerator according to claim 10 wherein the surface-friction-structured layer is made by a transparent material that obtains electrons when sufficiently touched; and the insulating substrate is in shape of a planar surface, an arched surface, or a spherical surface.

12. The method of manufacturing a single friction surface microgenerator according to claim 8 wherein the surface-friction-structured layer is made by a transparent material that produces charge transfer when sufficiently touched.

* * * * *